United States Patent [19]

Christophersen

[11] Patent Number: 4,489,498

[45] Date of Patent: Dec. 25, 1984

[54] BRACKET QUALIFIER DEVICE

[75] Inventor: Steven L. Christophersen, Clarkston, Mich.

[73] Assignee: Snap-on Tools Corporation, Kenosha, Wis.

[21] Appl. No.: 490,723

[22] Filed: May 2, 1983

[51] Int. Cl.³ .......................................... G01M 15/00
[52] U.S. Cl. .................................. 33/180 AT; 73/116
[58] Field of Search .......... 33/168 B, 180 AT, 181 R, 33/181 AT; 73/116; 324/391

[56] References Cited

U.S. PATENT DOCUMENTS 4,251,919  2/1981  Brown ................................. 33/168 B
4,384,481  5/1983  Simosato ................................. 73/116

Primary Examiner—Jerry W. Myracle
Attorney, Agent, or Firm—Emrich & Dithmar

[57] ABSTRACT

The bracket qualifier device comprises a body and first and second legs carried thereby. The first leg is adapted to be inserted into the magnetic probe receptacle of a combustion engine. The second leg carries a foot which mates with a corresponding shaped portion on the bracket which carries the receptacle.

4 Claims, 7 Drawing Figures

U.S. Patent    Dec. 25, 1984    4,489,498
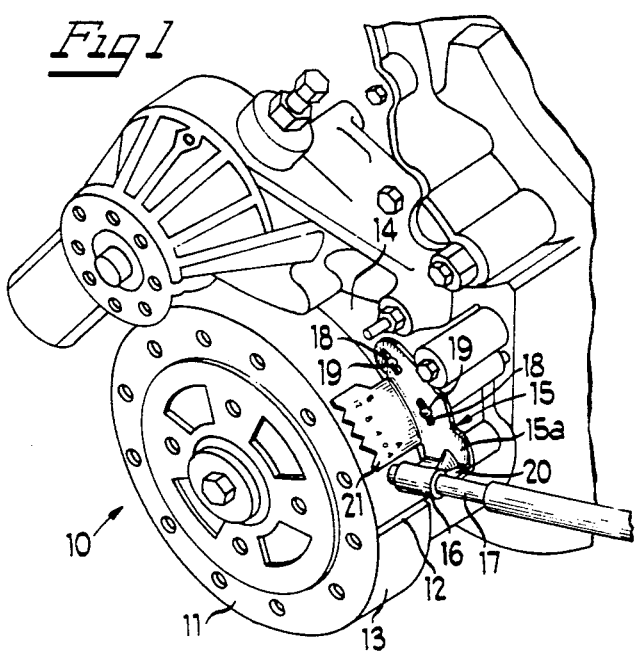
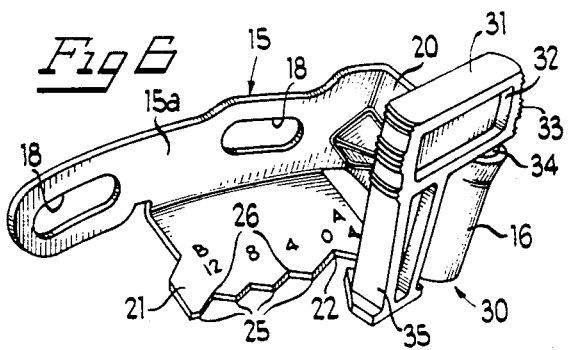
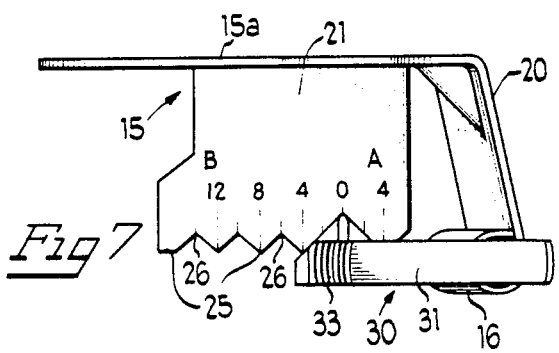
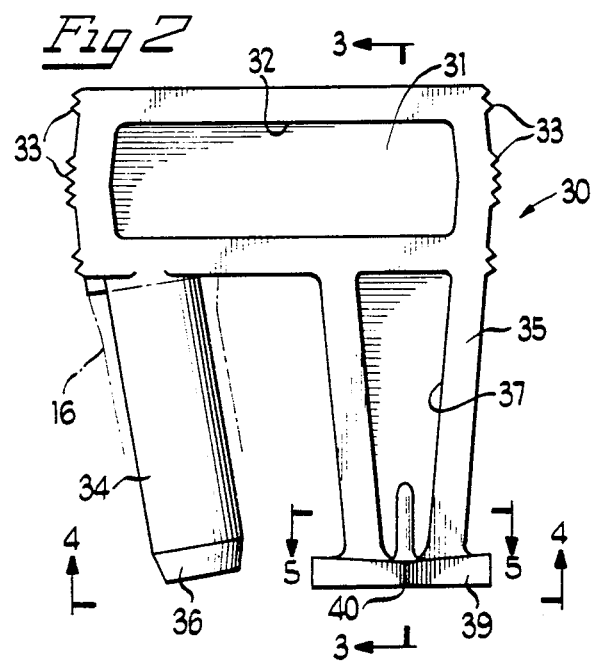
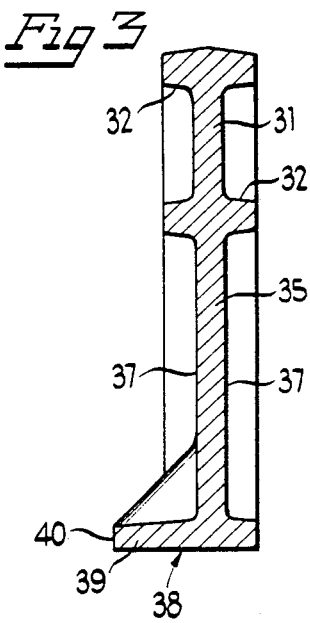
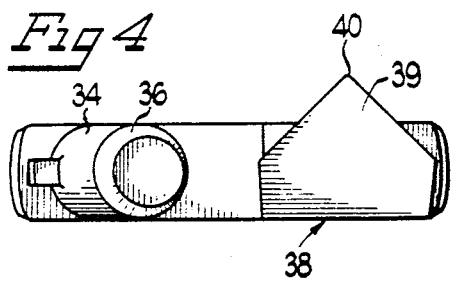
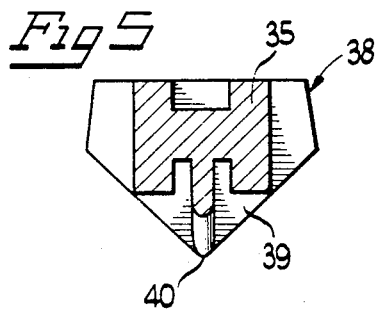

BRACKET QUALIFIER DEVICE

BACKGROUND OF THE INVENTION

In analyzing the timing of an internal combustion engine, determination is made of the timing angle, that is, the number of degrees between the time a piston in a selected cylinder reaches its top-dead-center position and the time that combustion takes place in that cylinder. Automobile manufacturers commonly specify the timing angle at a specific engine speed as a compromise to numerous considerations which must be taken into account.

Electrical signals in response to the occurrence of the combustion event may be generated in several ways, such as in response to light during combustion in a diesel engine or in response to pulses of spark-plug igniting current in a spark-ignited engine.

The occurrence of top dead center is identified in the following manner. An internal combustion engine includes a wheel mounted on the end of the engine crank shaft so as to rotate therewith. A notch or other marking means is located in the periphery of the wheel. A receptacle for a magnetic probe is attached to the engine block and is so located that the marking means on the rotating wheel will pass the receptacle a known number of degrees of crank shaft rotation after the number one (or other selected) cylinder has reached its top-dead-center position. This known number of degrees is commonly referred to as "offset".

In certain instances, the receptacle is part of a sheet-metal bracket. Such brackets are not perfectly rigid and have a tendency to bend and deform as the magnetic probe is inserted and/or withdrawn. This tendency is worsened because the receptacle is often located in difficult-to-reach places.

The position of the receptacle is located so as to be spaced from top dead center precisely by the amount of offset. If the receptacle is moved in the manner indicated above, the magnetic signal will not occur at the correct instant; instead it would occur too late or too early, thereby giving rise to an erroneous measurement of timing angle.

It is important to ensure proper orientation in location of the receptacle. On the other hand, the mechanic who is tuning an engine does not want to waste time in adjusting the receptacle.

SUMMARY OF THE INVENTION

It is an therefore an important object of the invention to enable adjustment of the magnetic-probe bracket in an internal combustion engine.

Another object is to enable such adjustment with a minimum of effort and time.

Another object is to enable such adjustment with a device that is simple to use and inexpensive to make.

In summary, there is provided a bracket qualifier device for use with an engine including a rotating part having marking means thereon representing top dead center, a fixed part adjacent to the rotating part, a bracket attached to the fixed part, the bracket having an attachment flange and an indicia flange and a receptacle flange, the attachment flange being attached to the fixed part, the indicia flange bearing indicia indicative of offset and having a first mating portion, the receptacle flange having a tendency to move and become displaced with respect to the attachment flange and the indicia flange, the receptacle flange carrying a receptacle which is periodically passed by the marking means and which is adapted to receive a magnetic pick-up probe, the bracket qualifier device comprising a body and first and second legs carried by the body, the first leg having a shape substantially matching the shape of the receptacle, a second mating portion on the second leg and having a shape substantially matching the shape of the first mating portion so as to be matable therewith, the first leg being adapted to fit into the receptacle and the receptacle flange being bendable to enable the second mating portion to mate with the first mating portion.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

FIG. 1 is a perspective view of a portion of an internal combustion engine having a magnetic-probe mounting bracket which is adjustable by use of a qualifier device incorporating the features of the present invention;

FIG. 2 is an elevational view of the bracket qualifier device;

FIG. 3 is a view in vertical section taken along the line 3—3 of FIG. 2;

FIG. 4 is a bottom plan view of the bracket qualifier device;

FIG. 5 is a view in horizontal section on enlarged scale taken along the line 5—5 of FIG. 2;

FIG. 6 is a perspective view showing the qualifier device engaged in the receptacle and being rotated toward the bracket indicia; and FIG. 7 is a top plan view showing the qualifier device in position.

DETAILED DESCRIPTION OF THE PREFERRED EMBODIMENTS

Turning now to the drawings and more particularly to FIG. 1 thereof, there is depicted a portion of an internal combustion engine 10. The crankshaft of the engine 10, or a shaft driven by the crankshaft, carries a rotating part such as an harmonic balancer 11. The harmonic balancer has an axially extending notch 12 in its cylindrical surface 13. Another marking means, such as a projection or embedded magnet, can be used in place of the notch 12. Adjacent to the harmonic balancer 11 is the engine front cover 14, to which is attached a bracket 15 which carries a radially directed receptacle 16. The inner end of the receptacle 16 is spaced slightly from the surface 13. As the harmonic balancer 11 rotates, the notch 12 passes the receptacle 16 once each revolution. The bracket 15 is permanently attached to the engine 10 at the factory.

When it is desired to time the engine, a timing meter (not shown) may be employed, such timing meter including a magnetic probe which has a tip portion 17 that is inserted into the receptacle 16. Such tip portion is cylindrical and is frictionally held by the receptacle 16. The end of the tip portion 17 is flat and is spaced very slightly from the surface 13. As the harmonic balancer 11 rotates, the notch 12 passes the tip portion 17 once each revolution. The probe of which the tip portion 17 is part creates a magnetic signal each time the notch 12 passes.

The receptacle 16 is so located that it is passed by the notch 12 a known number of degrees of crankshaft rotation after the piston in the number one cylinder has reached its top-dead-center position. The timing apparatus by having programmed therein the amount of the offset is able to establish the precise instant at which the number one cylinder reaches top dead center. That information is used in conjunction with information on the instant of combustion to determine the timing angle of the engine in degrees of crankshaft rotation.

In order to obtain accurate readings of the timing angle, the position of the receptacle 16 must be very carefully established and maintained. That is a principal purpose of the bracket 15. As may be best seen in FIGS. 6 and 7, it is constructed of one sheet metal piece bent to form its various components. The bracket 15 includes an elongated, flat attachment flange 15a in which is located a pair of longitudinally spaced-apart slots 18. Screws 19 pass through the slots 18 and threadedly engage in the engine front cover 14. The bracket 15 also includes a receptacle flange 20 depending from the flange 15a, the receptacle 16 being formed on the outer end of the flange 20. The bracket 15 also includes an indicia flange 21 which has a slight curvature to match the curvature of the surface 13 and is spaced slightly therefrom. The front end of the flange 21 has four notches therein one of which is identified by the reference numeral 22, such notches defining five front apices 25 and four rear apices 26.

Parallel lines are etched into the surface of the indicia flange 21 intersecting four of the front apices 25. At the rear of the four lines are the numerals "4", "4", "8", and "12". The number "0" is etched into the flange 21 adjacent the rear apex in the notch 22. The letter "A" is etched into the flange 21 behind the number "4" closer to the receptacle 16, and the letter "B" is etched into the flange 21 behind the number "12". The "4" on the "A" side of "0" signifies that combustion takes place 4° after top dead center while the numbers on the "B" side of "0" signifies combustion taking place 4°, 8° or 12° before top dead center. These indicia are used when the engine is timed with a timing light. They are ignored when a timing meter and an associated magnetic probe is used to determine timing. When a timing meter is used, it is essential that the position of the receptacle 16 be exactly as that for which it was designed. For example, in the particular engine 10, the receptacle 16 is located 9.5° after top dead center, top dead center being represented by the number "0" on the indicia flange 21. In other words, the angle between the axis of the receptacle 16 and a line passing through the axis of rotation of the harmonic balancer 11 and the "0" point on the bracket 15 is 9.5°.

Everything heretofore described in this detailed description is known construction and is in commercially available engines.

The bracket 15 is constructed of sheet metal. Although rigidifying means is commonly employed between the flanges 15a and 20, they tend to bend with respect to one another to cause the receptacle 16 to deviate from the nominal factory position. The screws 19 are tamper resistant so that a mechanic cannot change the position of the bracket 15 so that the indicia remains in the proper, factory-set position. However, the receptacle 16 can move because of bending of the flange 20. Even movements of few tenths of a degree introduce unacceptable error into the timing readings. The bracket 15 is often located in places that are not readily accessible. As a result, when the mechanic inserts the magnetic probe into the receptacle 16 or removes it, bending of the flange 20 may occur.

Referring to FIGS. 2–5, in order to qualify or adjust the receptacle 16 so that it is indeed at the correct location, there is provided a bracket qualifier device 30, preferably constructed of one piece and molded of plastic. The bracket qualifier device 30 comprises a generally rectangular body 31 having material-conserving recesses 32 formed in the side walls thereof and ridges 33 in the end walls thereof. The body 31 carries a pair of converging legs 34 and 35. The angle between the longitudinal axes of the legs 34 and 35 corresponds to the desired angle between the axes of the receptacle 16 and the zero degree point. In the embodiment being described, that angle is 9.5°.

The leg 34 is designed to be inserted into the receptacle 16. It is cylindrical which is the shape of the opening in the receptacle 16 but has a smaller diameter so as to be freely engageable and rotatable therein. The tip of the leg 34 has a chamfer 36 to facilitate insertion of the leg 34 into the receptacle 16.

The other leg 35 is generally rectangular in cross section and has recesses 37 in its side walls also for conserving material. The leg 35 carries a foot 38 which is generally plate-like and has a triangular portion 39. The apex 40 of the portion 39 matches the angle of the notch 22 in the bracket 15. In an operative example, the angle of the notch 22 is 90° as was the angle of the portion 39.

Referring to FIGS. 6 and 7, the manner in which the bracket qualifier device 30 is used will be described. The leg 34 is slipped into the receptacle 16 as shown. The body 31 is grasped and is rotated so that the leg 35 is aimed toward the bracket 15, as shown in FIG. 6. If the angle of the receptacle 16 is precisely correct, that is in this example, it is 9.5°, then the portion 39 will enter the notch 22 and the side walls of the portion 39 will mate with the side walls of the notch 22, as shown in FIG. 7. On the other hand, if the receptacle 16 is out of alignment, the apex 40 of the foot 38 will strike one or the other of the walls of the notch 22. The mechanic would bend the flange 20 in the appropriate direction until the portion 39 is seated precisely in the notch 22. He would then know that the receptacle 16 is at its proper position.

This procedure of qualifying the receptacle 16 is a very simple task and therefore can be performed by the mechanic preparatory to timing the engine 10. In other words, whenever the mechanic times an engine, one of the first steps will be use of the qualifier device 30 to properly orient the receptacle 16. Then, the readings of timing angle will be more accurate.

While the above description refers to the notch 22 and the portion 39 as being triangular, other shapes would work. Also the foot 38 need not be the male element.

What has been described therefore is a bracket qualifier device which is used to quickly and easily adjust the position of the magnetic probe receptacle in an engine.

I claim:

1. A bracket qualifier device for use with an engine including a rotating part having marking means thereon representing top dead center, a fixed part adjacent to the rotating part, a bracket attached to the fixed part, the bracket having an attachment flange and an indicia flange and a receptacle flange, the attachment flange being attached to the fixed part, the indicia flange bearing indicia indicative of offset and having a first mating portion, the receptacle flange having a tendency to move and become displaced with respect to the attachment flange and the indicia flange, the receptacle flange carrying a receptacle which is periodically passed by the marking means and which is adapted to receive a magnetic pick-up probe, the bracket qualifier device comprising a body and first and second legs carried by said body, said first leg having a shape substantially matching the shape of the receptacle, a second mating portion on said second leg and having a shape substantially matching the shape of said first mating portion so as to be matable therewith, said first leg being adapted to fit into the receptacle and the receptacle being bendable to enable said second mating portion to mate with the first mating portion.

2. The bracket qualifier device of claim 1, wherein said first leg is cylindrical and is rotatable in the receptacle.

3. The bracket qualifier device of claim 1, wherein said second mating portion is a male element.

4. The bracket qualifier device of claim 1, wherein said second mating portion is generally triangular in shape.

* * * * *